US007486656B2

(12) United States Patent
Lin

(10) Patent No.: US 7,486,656 B2
(45) Date of Patent: Feb. 3, 2009

(54) METHOD AND SYSTEM FOR A MOBILE UNIT TO SYNCHRONIZE WITH BASE STATION

(75) Inventor: Che-Li Lin, Taipei (TW)

(73) Assignee: Qisda Corporation, Taoyuan County (TW)

( * ) Notice: Subject to any disclaimer, the term of this patent is extended or adjusted under 35 U.S.C. 154(b) by 892 days.

(21) Appl. No.: 10/687,886

(22) Filed: Oct. 20, 2003

(65) Prior Publication Data
US 2004/0085921 A1 May 6, 2004

(30) Foreign Application Priority Data
Oct. 25, 2002 (TW) ............... 91124964 A

(51) Int. Cl.
*H04J 3/06* (2006.01)
(52) U.S. Cl. .................... 370/350; 370/509
(58) Field of Classification Search ............. 370/324, 370/335, 342, 350, 509, 304, 320, 326, 336, 370/345, 395.62, 441, 496, 498, 503, 510, 370/512; 375/355
See application file for complete search history.

(56) References Cited

U.S. PATENT DOCUMENTS 6,480,558 B1 * 11/2002 Ottosson et al. ............. 375/350
6,539,032 B2 * 3/2003 Rudolf ....................... 370/503
6,665,277 B1 * 12/2003 Sriram ....................... 370/324
6,741,578 B1 * 5/2004 Moon et al. ................. 370/335

OTHER PUBLICATIONS

Article entitled "Cell Search in W-CDMA" by Yi-Pin Eric Wang et al. published in the IEEE Journal On Selected Areas In Communication, vol. 18, No. 8, Aug. 2000, pp. 1470-1482.

* cited by examiner

*Primary Examiner*—Seema S Rao
*Assistant Examiner*—Leon Andrews

(57) ABSTRACT

The present invention is related to a method and apparatus for a mobile unit to synchronize with the base station in WCDMA system. First, the mobile unit receives the signal transmitted from the base station. The signal includes a primary synchronization channel, a secondary synchronization channel and a common pilot channel. Then, the mobile unit obtains a sample signal and selects a part of the sample signal to be a first period signal and a second period signal. The mobile unit further synchronizes with the base station according to the first period signal, primary synchronization channel, second period signal, secondary synchronization channel and the common pilot channel.

9 Claims, 3 Drawing Sheets

METHOD AND SYSTEM FOR A MOBILE UNIT TO SYNCHRONIZE WITH BASE STATION

CROSS REFERENCE TO RELATED APPLICATIONS

This Application claims priority to Taiwan Patent Application No. 091124964 entitled "Method and System for a Mobile Unit to Synchronize with Base Station", filed Oct. 25, 2002.

FIELD OF THE INVENTION

The present invention relates to a method and system for a mobile unit to synchronize with base station, and more particularly, to a method and system for a mobile unit to synchronize with base station with a primary synchronization channel, a secondary synchronization channel and a common pilot channel.

BACKGROUND OF THE INVENTION

In the CDMA system, a mobile unit needs to code and time synchronize with the serving base station before any communications with the base station can take place. In synchronous base station system, such as CDMA-2000, the same scramble code with different time offset is employed.

In asynchronous base station system, such as WCDMA, different scramble codes are used in base systems. Therefore, the mobile unit of a mobile system in WCDMA system needs not only to synchronize in the time but also to search the scramble code employed by the serving system.

Besides, the initial frequency uncertainty can be large during the synchronization. Typical voltage control temperature compensated crystal oscillators have an inaccuracy of around 10 ppm, which is equal to 20 kHz with radio frequency of 2 GHz. This frequency uncertainty induces timing inaccuracy and performance degradation. The performance of synchronization during initial cell search will cause switched-on delay of a mobile unit.

In WCDMA system, base station typically employs downlink scrambling code. There are 512 primary downlink scrambling codes for reusing. Because the method of identifying the scrambling code is complex and requires more time to synchronize with the base station, a pipelined process method in "Cell Search in W-CDMA." (*IEEE journal on Selected Areas in Communication*, Vol 18, No 8, August 2000) is disclosed to accelerate the synchronization. The pipelined process reduces the time of synchronization and the average time of the spreading code synchronization. Three downlink channels are used to process code synchronization: a primary synchronization channel (P-SCH), a secondary synchronization channel (S-SCH), and a common pilot channel (CPICH). The method is carried out in three steps:

Step 1: Slot Synchronization

In step 1, the mobile unit uses the primary synchronization channel to acquire slot synchronization with a base station. This is typically done with a signal matched filter (or other similar devices) matched with the primary synchronization channel. The slot timings can be obtained by detecting the peaks of the matched filter output.

Step 2: Frame Synchronization and Code-Group Identification

In step 2, the mobile unit uses the secondary synchronization channel to achieve frame synchronization and identify the code group found in step 1. This is done by correlating the received signal with all possible secondary synchronization channel sequences and identifying the maximum correlation value. Since the cyclic shifts of the sequences are unique the code group as well as the frame synchronization is determined.

Step 3: Scrambling-Code Identification

In step 3, the mobile unit determines the exact primary scrambling channel. The primary scrambling code is typically identified through symbol-by-symbol correlation over the common pilot channel with all codes within the code group identified in step 2. After the primary scrambling code has been identified, the primary common control physical channel can be detected. The system and specific information can be read too.

The frame, 10 ms (38400 chips), can be divided into 15 time slots, for example. Each time slot can be divided into 10 symbols.

After receiving the downlink signal from the base station in the process of synchronization, the mobile unit samples the signal. According to the sample signal, the mobile unit proceeds with the slot synchronization of step 1 during a first period. During a second period, the mobile unit executes the frame synchronization and code-group identification of step 2 according to the result of step 1, and samples the signal received from the base station to execute a new step 1. During a third period, the mobile unit executes scrambling-code identification of step 3 according to the result of step 2, executes a new step 2 according to the result of the new step 1, and re-executes step 1. If the result obtained from step 3 is determined failed (the mobile unit does not synchronize with the base station), the mobile unit re-executes step 3 according to the result of the new step 2, executes the step 2 according to the result of step 1 executed during the third period, and re-executes step 1 during a fourth period, and so on. The mobile unit finishes the steps mentioned above until it synchronizes with the base station.

FIG. 1 is an example of a prior art for a mobile unit to synchronize with base station. The mobile unit receives the signal from the base station and samples the signal. First, the mobile unit executes step 1 during a first period, obtaining a first slot synchronization by using sample signal and primary synchronization channel. During a second period, the mobile unit executes step 2, obtaining a first frame synchronization and a first code-group identification according to the first slot synchronization in step 1 and the secondary synchronization channel of the sample signal. Meanwhile, in order to avoid synchronization failure, the mobile unit uses sample signal and the primary synchronization signal to re-execute step 1 and obtains a second slot synchronization during the second period.

During a third period, the mobile unit executes step 3 according to the first frame synchronization of the second period and the common pilot channel of the sample signal, and obtains a first scrambling-code identification. Meanwhile, the mobile unit executes step 2 according to the second slot synchronization obtained of the second period and the secondary synchronization channel of the sample signal, and obtains a second frame synchronization and a second code-group identification. Similarly, in order to avoid synchronization failure, the mobile unit uses sample signal and the primary synchronization signal to re-execute step 1, and obtains a third slot synchronization during the third period.

In this case, if the result of the first scrambling-code identification of the third period is determined to be that the mobile unit does not synchronize with base station, then the mobile unit executes step 3 according to the second frame synchronization, second code-group identification and common pilot channel obtained during the third period, and obtains a second scrambling-code identification. Meanwhile, the mobile unit executes step 2 according to the third slot synchronization and secondary synchronization channel, and obtains a third frame synchronization and a code-group identification. In order to avoid synchronization failure, the mobile unit uses sample signal and the primary synchronization signal to re-execute step 1, and obtains a fourth slot synchronization during the fourth period.

Since system accuracy depends on the sample rate in step 1, increasing system accuracy complicates the design of matched filter and calculating circuits, and wastes hardware resources. In addition, the inaccuracy caused by the frequency differences of timing happened during step 1 influences the accuracy of step 2 and step 3, and prolongs the synchronization time.

SUMMARY OF THE INVENTION

The present invention provides a method and system for a mobile unit to synchronize with base station in a WCDMA system. The present invention further saves hardware resources and reduces inaccuracy caused by frequency differences.

First, a signal including a primary synchronization channel, a secondary synchronization channel and a common pilot channel transmitted from the base station is received by the mobile unit. A sample signal is obtained by sampling the signal. The first period signal is the odd sample signal obtained during the first period. The second period signal is the even sample signal obtained during the second period. In adjacent periods, the odd point and even point are alternately chosen to be the sample signal of the period. A first slot timing is obtained according to the first period signal and the slot synchronization of step 1. A second slot timing is obtained according to the second period signal and the slot synchronization of step 1. Because the adjacent slot timings are obtained by alternately selecting an odd sample signal and selecting an even sample signal, e.g. the first slot timing and the second slot timing, the present invention combines the adjacent slot timings to be the slot timing of the succeeding step 2 and step 3. This makes the timings of step 2 or step 3 more accurate and increases the accuracy of step 2 and step 3.

The selecting ways during the first and second periods may be selectively selecting odd said sample signal and selecting even said sample signal, or may be other predetermined selecting ways.

Furthermore, the present invention provides an apparatus for a mobile unit to synchronize with a base station in a WCDMA system. The base station transmits a signal to the mobile unit. The signal has a primary synchronization channel, a secondary synchronization channel, and a common pilot channel. The apparatus includes a receiving unit, a sampling unit, a selecting unit, a first synchronization unit, a second synchronization and a third synchronization.

After the receiving unit receives the signal, the sampling unit samples the signal and obtains a sample signal. The selecting unit selects a part of the sample signal during each period in a predetermined way. For example, the selecting unit selects the odd sample signal during the first period to be the first period signal, and selects the even sample signal during the second period to be the second period signal. The first synchronization unit obtains a slot timing according to the period signal and primary synchronization channel. The second synchronization unit obtains frame synchronization and code-group identification according to the slot timings obtained from step 1 during preceding two periods and the secondary synchronization. The third synchronization unit obtains the scrambling-code identification signal according to the slot timings obtained from step 1 during two preceding periods, the frame synchronization signal and code-group identification obtained from step 2, and the common pilot channel.

DETAILED DESCRIPTION OF THE INVENTION

After the mobile unit is powered on, the mobile unit receives a signal transmitted from the base station. The signal has a primary synchronization channel, a secondary synchronization channel, and a common pilot channel. The mobile unit uses a sampling device, e.g. sample-hold circuit, to sample the signal and obtains a sample signal, e.g. $X_1, X_2, X_3 \ldots X_{40}$. During the synchronization process, the present invention includes the following steps:

Step 1A:
The mobile unit selects a part of the sample signal during a period to be a period signal. The mobile unit further obtains the slot synchronization signal and slot timing according to the period signal and the primary synchronization channel.

Step 1B:
The mobile unit selects a part of the sample signal during a period to be a period signal. The mobile unit further obtains the slot synchronization signal and slot timing according to the period signal and the primary synchronization channel.

Step 2':
The mobile unit obtains a frame synchronization signal and code-group identification according to the slot timing, slot synchronization signal obtained from step 1A and/or 1B, and the secondary synchronization channel.

Step 3':
The mobile unit obtains a scrambling-code identification signal according to the slot timings obtained from step 1A and step 1B, the frame synchronization signal and code-group identification obtained from step 2, and the common pilot channel.

Figure 1:
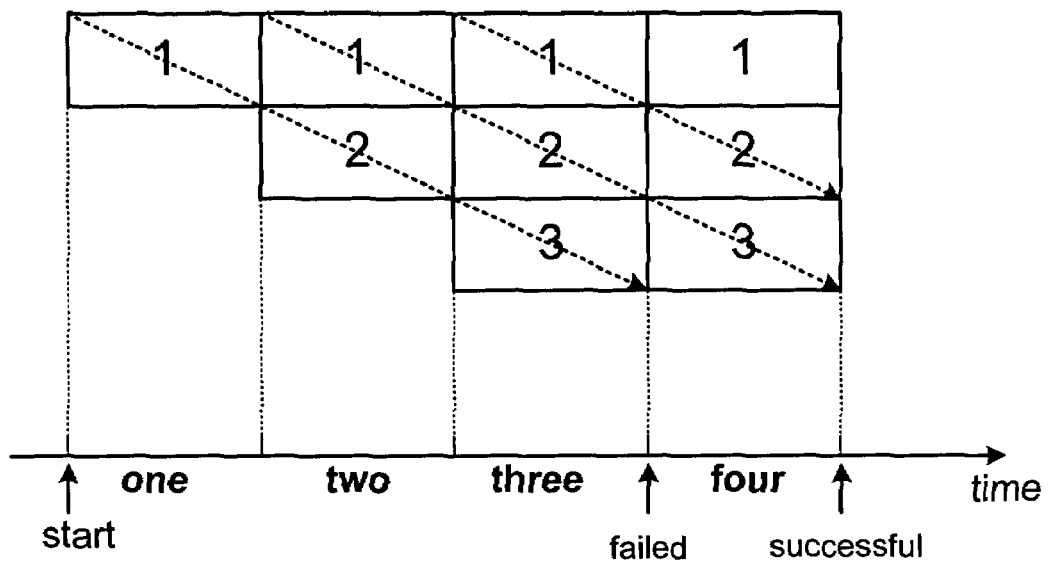
FIG. 1 shows an example of prior art of synchronizing with base station.
Figure 2:
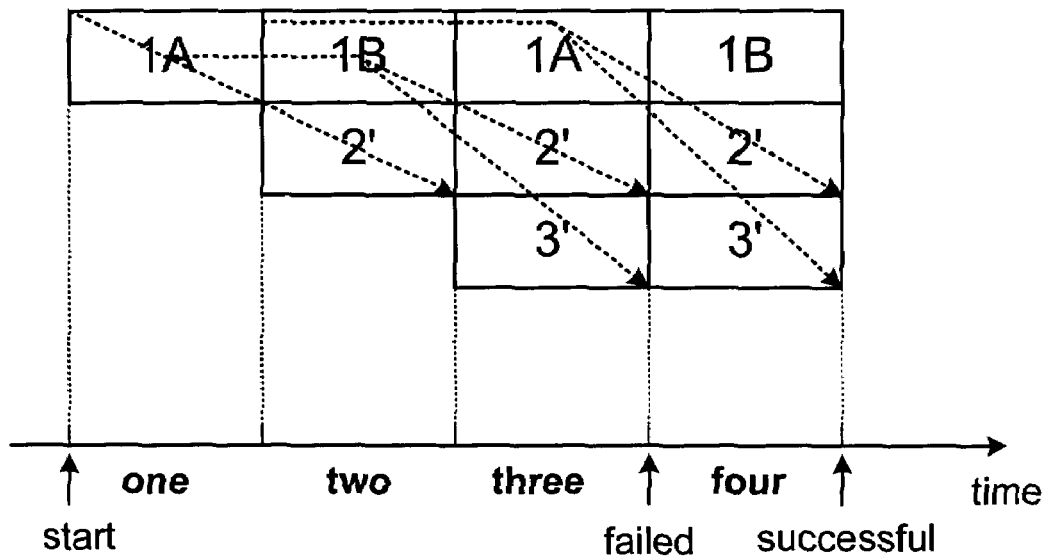
FIG. 2 shows the flowchart of the present invention.

FIG. 2 shows the flowchart of the present invention. In order to accelerate the synchronization process, the present invention also employs the pipeline process method to execute the steps above. First, the mobile unit executes step 1A during the first period. If there are 10 sample signals during the first period and the mobile unit selects a part of the sample signal by a first selecting way, selecting odd sample signals for example, the first period signal will be $X_1, X_3, X_5, X_7, X_9$. The present invention obtains a first slot synchronization signal and a first slot timing according to the first period signal $X_1, X_3, X_5, X_7, X_9$ and the primary synchronization channel.

During the second period, the mobile unit executes step 2' and obtains a first frame synchronization signal and code-group identification according to the first slot synchronization signal, the first slot timing, secondary synchronization channel, and second period signal. The second period signal is selected by a second selecting way, selecting the even sample signal, for example, $X_{12}, X_{14}, X_{16}, X_{18}$, and $X_{20}$. Meanwhile, the mobile unit executes step 1B, and obtains a second slot timing and a second slot synchronization signal according to the second period signal $X_{12}, X_{14}, X_{16}, X_{18}, X_{20}$, and the primary synchronization channel.

During the third period, the mobile unit obtains a first scrambling-code identification signal by executing step 3' according to the first frame synchronization signal, the first code-group identification, and the second slot timing obtained during the second period, the first slot timing obtained during the first period, the third period signal, and the common pilot channel. The third period signal, e.g. $X_{21}$, $X_{23}, X_{25}, X_{27}, X_{29}$ is selected from the sample signal by the first selecting way. Meanwhile, the mobile unit executes step 2' according to the second slot timing obtained during the second period, first slot timing obtained during the first period, the secondary synchronization channel, and the third period signal, and obtains the second frame synchronization signal and second code-group identification. In addition, the mobile unit executes step 1A during the third period according to the third period signal $X_{21}, X_{23}, X_{25}, X_{27}, X_{29}$, and the primary synchronization channel, and obtains the third slot timing.

Because the first scrambling-code identification signal of the step 3' of the third period reveals that the mobile unit does not synchronize with the base station, the mobile unit then executes step 3' during the fourth period according to the second frame synchronization signal, code-group identification and the third slot timing obtained during the third period, the second slot timing obtained during the second period, and the fourth period signal. The mobile unit obtains the second scrambling-code identification signal according to the second frame synchronization signal and the common pilot channel. Meanwhile, the mobile unit executes step 2' according to the third slot timing obtained during the third period, the second slot timing obtained during the second period, the secondary synchronization channel, and the fourth period signal, and obtains the third frame synchronization signal and the third code-group identification. The fourth period signal, e.g. $X_{32}$, $X_{34}, X_{36}, X_{38}, X_{40}$, is selected from the sample signal by the second selecting way. In addition, the mobile unit executes step 1B during the fourth period according to the fourth period signal $X_{32}, X_{34}, X_{36}, X_{38}, X_{40}$ and the primary synchronization channel, and obtains the fourth slot timing and the fourth slot synchronization signal. If the second scrambling-code identification signal reveals that the mobile unit synchronizes with the base station, the mobile unit stops the synchronization process. If the second scrambling-code identification signal reveals that the mobile unit does not synchronize with the base station, the mobile unit re-executes the synchronization steps mentioned above.

Figure 3:
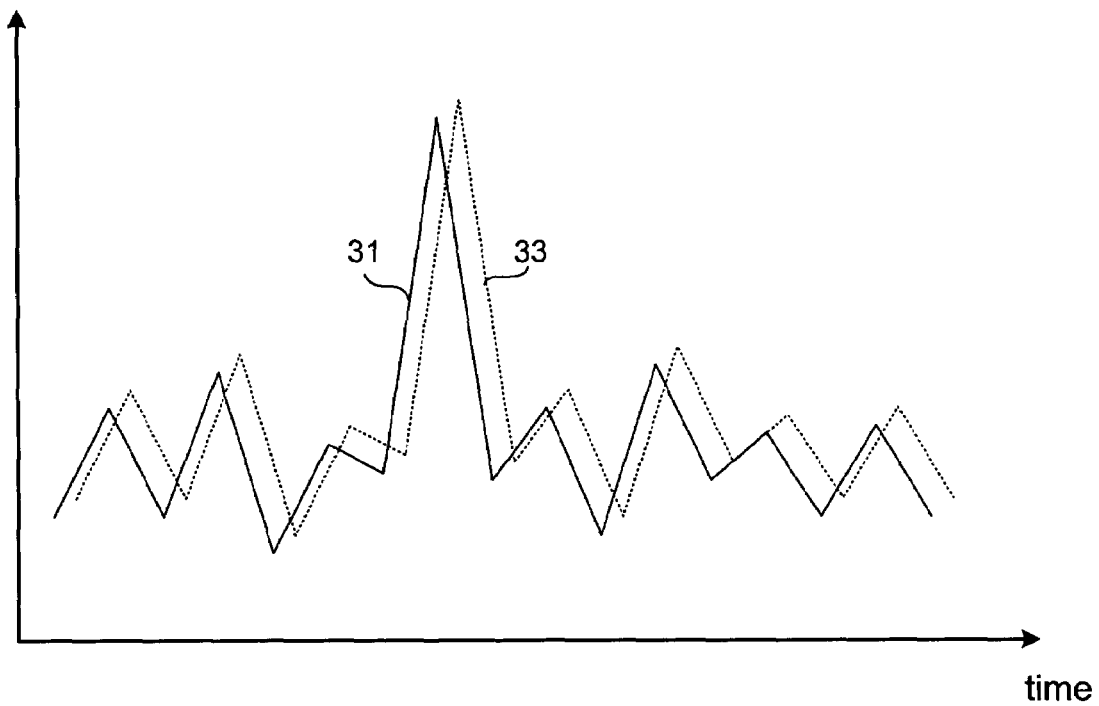
FIG. 3 shows peak profiles obtained in step 1A and 1B.

The mobile unit matches the primary synchronization channel by using a matched filter (or other similar devices), and obtains the slot timing by detecting peak value of the matched filter output. To improve the problem of frequency differences, the present invention compares the first slot timing and the second slot timing in step 2', and selects the better slot timing for the following process. As shown in FIG. 3, line 31 and line 33 are the peak profiles respectively obtained in step 1A and step 1B. The mobile unit obtains the first slot timing and the second slot timing according to the peak profiles. In this embodiment, the peak profile of step 1B is better than that of step 1A. Therefore, the mobile unit selects the second slot timing to be the slot timing for the following process. The mobile unit obtains the frame synchronization according to the second slot timing, the slot synchronization signal, and the secondary synchronization channel.

The above method can save hardware resources such as matched filters. The more complex the operation of the matched filter is, the more electric power matched filter wastes and the more difficult its design is. Since the present invention processes fewer signals during one period, the operation and design of the matched filter are simpler. The present invention further saves more electric power and reduces costs. By selecting the better value of the first slot timing and the second slot timing, the present invention significantly reduces the inaccuracy caused by frequency differences of step 1 and accelerates the synchronization process.

It should be noticed that the first selecting way and the second selecting way in the exemplary embodiment have been described by way of illustration only. Various modifications of the illustrative embodiment will be apparent to persons skilled in the art upon reference to this description.

Figure 4:
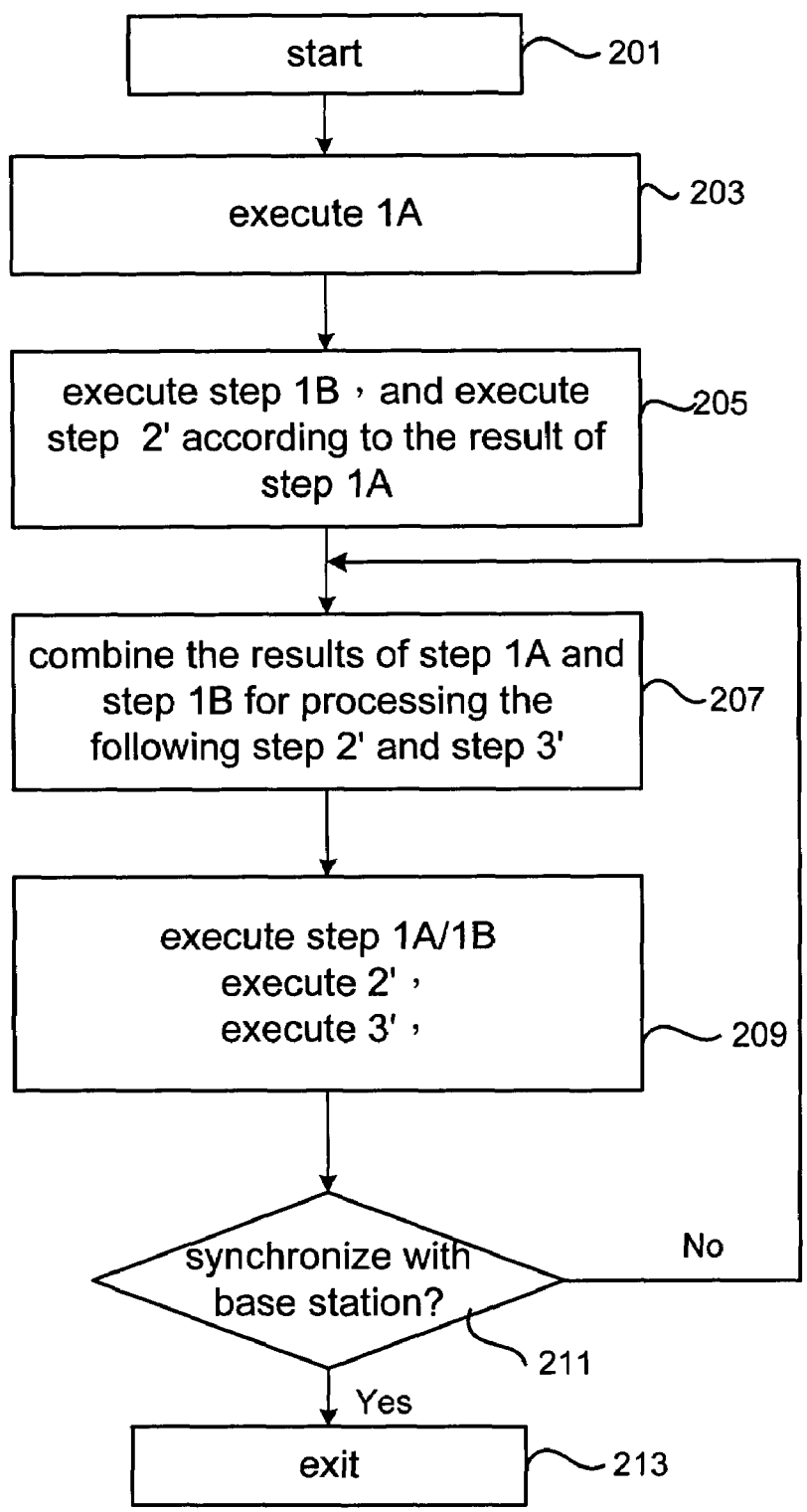
FIG. 4 shows an exemplary embodiment of synchronizing method of the present invention.

FIG. 4 is the flowchart of the present invention. First, the mobile unit is powered on and receives the signal transmitted from the base station. The mobile unit, in step 203, executes step 1A during the first period. After executing step 1A, the mobile unit, in step 205, executes step 1B, and executes step 2' according to the slot synchronization obtained in step 1A during the second period. During the third period, the mobile unit, in step 207, combines the results of the slot synchronization of step 1A and step 1B for processing the following step 2' and step 3'. The mobile unit, in step 209, executes step 1A or step 1B. The mobile unit alternately executes step 1A and step 1B during adjacent periods. Furthermore, the mobile unit executes step 2' and step 3' according to the slot synchronization of step 207. Lastly, the present invention determines whether the mobile unit synchronizes with base station in step 211. If the mobile unit synchronizes with the base station, the present invention exits the whole synchronization process in step 213. If the mobile unit does not synchronize with the base station, the present invention returns to step 207.

Figure 5:
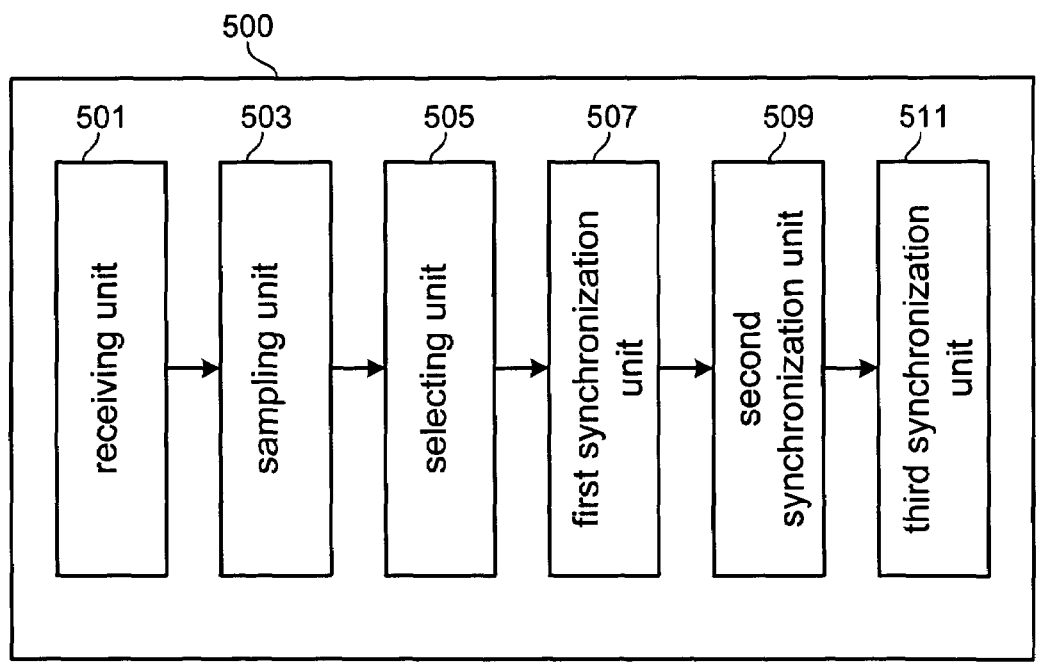
FIG. 5 shows an exemplary embodiment of synchronizing apparatus of the present invention.

Besides, the present invention provides an apparatus for a mobile unit to synchronize with a base station in a WCDMA system. The base station transmits a signal to the mobile unit. The signal has a primary synchronization channel, a secondary synchronization channel, and a common pilot channel. As shown in FIG. 5, the apparatus includes a receiving unit 501, a sampling unit 503, a selecting unit 505, a first synchronization unit 507, a second synchronization unit 509, and a third synchronization unit 511.

The receiving unit 501 receives the signal from the base station. The sampling unit 503 samples the signal and generates a sample signal.

During the odd periods, the selecting unit 505 selects the sample signal to be a period signal by a first selecting way. During the even periods, the selecting unit 505 selects the sample signal to be a period signal by a second selecting way. In this exemplary embodiment, the mobile unit selects the odd sample signals during the odd periods and selects the even sample signals during the even periods. It should be noticed that the selecting way in the exemplary embodiment have been described by way of illustration only. Various modifications of the illustrative embodiment will be apparent to persons skilled in the art upon reference to this description.

The first synchronization unit 507 obtains the slot synchronization according to the period signal and the primary synchronization. The second synchronization unit 509 obtains the frame synchronization signal and code-group identification according to the slot timings of two preceding periods, the secondary synchronization channel and the period signal. The third synchronization unit 511 obtains the scrambling-code identification according to the slot timings of two preceding periods, the frame synchronization signal and code-group identification of the preceding period, the common pilot channel, and the period signal. If the present invention determines the mobile unit does not synchronize with the base station, the present invention abandons the scrambling-code identification signal.

While the invention has been described in connection with what is presently considered to be the most practical and preferred embodiments, it is to be understood that the invention is not to be limited to the discovered embodiments. The invention is intended to cover various modifications and equivalent arrangement included within the spirit and scope of the appended claims.

The invention claimed is:

1. A method for a mobile unit synchronizing with a base station in a WCDMA system, the base station transmitting a signal to the mobile unit, the signal having a primary synchronization channel, a secondary synchronization channel, and a common pilot channel, the method comprising:
   receiving the signal;
   sampling the signal in each slot period to generate a plurality of sample signals;
   selecting either odd ones or even ones of the sample signals during a first slot period to be a first period signal;
   obtaining a first slot timing according to the first period signal and the primary synchronization channel;
   selecting even ones of the sample signals during a second slot period to be a second period signal if odd ones of the sample signals are selected during the first slot period, selecting odd ones of the sample signals during the second slot period to be the second period signal if even ones of the sample signals are selected during the first slot period;
   obtaining a second slot timing and a slot synchronization signal according to the second period signal and the primary synchronization channel;
   selecting even ones of the sample signals during a third slot period to be a third period signal if odd ones of the sample signals are selected during the second slot period, selecting odd ones of the sample signals during the third slot period to be a third period signal if even ones of the sample signals are selected during the second slot period;
   obtaining a frame synchronization signal according to the first slot timing, the second slot timing, the slot synchronization signal, the secondary synchronization channel, and the third period signal; and
   obtaining a scrambling-code identification signal according to the first slot timing, the second slot timing, the frame synchronization signal, and common pilot channel and the third period signal.

2. An apparatus for mobile unit synchronizing with a base station in a WCDMA system, the base station transmitting a signal to the mobile unit, the signal having a primary synchronization channel, a secondary synchronization channel, and a common pilot channel, the apparatus comprising:
   a receiving unit for receiving the signal;
   a sampling unit for sampling the signal in each slot period to generate a plurality of sample signals;
   a selecting unit for selecting either odd ones or even ones of the sample signals during a first slot period to be a first period signal, selecting even ones of the sample signals during a second slot period to be a second period signal if odd ones of the sample signals are selected during the first slot period, selecting odd ones of the sample signals during the second slot period to be the second period signal if even ones of the sample signals are selected during the first slot period, selecting even ones of the sample signals during a third slot period to be a third period signal if odd ones of the sample signals are selected during the second slot period, selecting odd ones of the sample signals during the third slot period to be the third period signal if even ones of the sample signals are selected during the second slot period, and selecting even ones of the sample signals during a fourth slot period to be a fourth period signal if odd ones of the sample signals are selected during the third slot period, selecting odd ones of the sample signals during the fourth slot period to be the fourth period signal if even ones of the sample signals are selected during the third slot period;
   a first synchronization unit for obtaining a first slot synchronization signal according to the first period signal and the primary synchronization channel, and obtaining a second slot synchronization signal according to the second period signal and the primary synchronization channel;
   a second synchronization unit for obtaining a first frame synchronization signal according to a first slot synchronization signal, the secondary synchronization channel, and the third period signal, and obtaining a second frame synchronization signal according to a second slot synchronization signal, the secondary synchronization channel, and the fourth period signal; and
   a third synchronization unit for obtaining a first scrambling-code identification signal according to the first frame synchronization signal, the common pilot channel, and the third period signal.

3. The apparatus of claim 2, abandoning the first scrambling-code identification signal if the mobile unit does not synchronize with the base station, and obtaining a second scrambling-code identification signal according to the second frame synchronization signal, the common pilot channel and the fourth period signal.

4. The apparatus of claim 2, the first synchronization unit further obtaining a first slot timing according to the first period signal and the primary synchronization channel.

5. The apparatus of claim 4, the first synchronization unit further obtaining a second slot timing according to the second period signal and the primary synchronization channel.

6. The apparatus of claim 5, wherein the second synchronization unit obtains the second slot timing by referring to the first slot timing and the second slot timing.

7. A method for a mobile unit synchronizing with a base station, the base station transmitting a signal to the mobile unit, the signal having a primary synchronization channel, a secondary synchronization channel, and a common pilot channel, comprising:
   receiving and sampling the signal in each slot period to generate a plurality of sample signals;
   selecting either odd ones or even ones of the sample signals during a first slot period to be a first period signal;
   obtaining a first slot timing according to the first period signal and the primary synchronization channel;
   selecting even ones of the sample signals during a second slot period to be a second period signal if odd ones of the sample signals are selected during the first slot period, selecting odd ones of the sample signals during a second slot period to be a second period signal if even ones of the sample signals are selected during the first slot period;

obtaining a second slot timing and a slot synchronization signal according to the second period signal and the primary synchronization channel;

selecting even ones of the sample signals during a third slot period to be a third period signal if odd ones of the sample signals are selected during the second slot period, selecting odd ones of the sample signals during a third slot period to be a third period signal if even ones of the sample signals are selected during the second slot period;

achieving a frame synchronization according to the secondary synchronization channel, wherein both the first slot timing and the second slot timing are regarded as a reference for a slot timing in processing the frame synchronization; and obtaining a scrambling-code identification signal according to the first slot timing, the second slot timing, the frame synchronization, and the common pilot channel and the third period signal.

8. A method for a mobile unit synchronizing with a base station, the base station transmitting a signal to the mobile unit, the signal having a primary synchronization channel, a secondary synchronization channel, and a common pilot channel, comprising:

receiving and sampling the signal in each slot period to generate a plurality of sample signals;

selecting either odd ones or even ones of the sample signals during a first slot period to be a first period signal;

obtaining a first slot timing according to the first period signal and the primary synchronization channel;

selecting even ones of the sample signals during a second slot period to be a second period signal if odd ones of the sample signals are selected during the first slot period, selecting odd ones of the sample signals during the second slot period to be the second period signal if even ones of the sample signals are selected during the first slot period;

obtaining a second slot timing according to the second period signal and the primary synchronization channel;

achieving a frame synchronization according to the secondary synchronization channel, wherein either the first slot timing or the second slot timing is selected as a slot timing in processing the frame synchronization.

9. The method of claim 8, wherein selecting either the first slot timing or the second slot timing as a slot timing in processing the frame synchronization further comprises:

obtaining a first peak profile of the first period signal;

obtaining a second peak profile of the second period signal; and comparing the first peak profile and the second peak profile.

\* \* \* \* \*